(12) United States Patent
Peng et al.

(10) Patent No.: US 11,295,178 B2
(45) Date of Patent: Apr. 5, 2022

(54) IMAGE CLASSIFICATION METHOD, SERVER, AND COMPUTER-READABLE STORAGE MEDIUM

(71) Applicant: TENCENT TECHNOLOGY (SHENZHEN) COMPANY LIMITED, Shenzhen (CN)

(72) Inventors: Pai Peng, Shenzhen (CN); Kailin Wu, Shenzhen (CN); Xiaowei Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 94 days.

(21) Appl. No.: 16/853,636

(22) Filed: Apr. 20, 2020

(65) Prior Publication Data

US 2020/0250497 A1  Aug. 6, 2020

Related U.S. Application Data

(63) Continuation of application No. PCT/CN2018/110664, filed on Oct. 17, 2018.

(30) Foreign Application Priority Data

Nov. 1, 2017  (CN) .......................... 201711060208.2

(51) Int. Cl.
*G06K 9/00* (2006.01)
*G06K 9/62* (2022.01)
(Continued)

(52) U.S. Cl.
CPC ......... *G06K 9/6277* (2013.01); *G06K 9/6215* (2013.01); *G06K 9/6232* (2013.01);
(Continued)

(58) Field of Classification Search
None
See application file for complete search history.

(56) References Cited

U.S. PATENT DOCUMENTS

| 2004/0126008 | A1 | 7/2004 | Chapoulaud et al. |
| 2018/0012107 | A1 | 1/2018 | Xu et al. |
| 2019/0221313 | A1* | 7/2019 | Rim .......................... G06T 7/00 |

FOREIGN PATENT DOCUMENTS

| CN | 102930293 A | 2/2013 |
| CN | 106214120 A | 12/2016 |

(Continued)

OTHER PUBLICATIONS

The World Intellectual Property Organization (WIPO) International Search Report for PCT/CN2018/110664 dated Dec. 29, 2018 5 Pages (including translation).

(Continued)

*Primary Examiner* — Soo Jin Park
(74) *Attorney, Agent, or Firm* — Anova Law Group, PLLC

(57) ABSTRACT

An image classification method includes: obtaining an original image and a category of an object included in the original image; adjusting a first display parameter of the original image to obtain an adjusted original image; and transforming a second display parameter of the original image to obtain a new image. The adjusted first display parameter satisfies a value condition; and the transformed second parameter of the new image satisfies a distribution condition. The method also includes training a neural network model based on the category of the included object and a training set constructed by combining the adjusted original image and the new image; and inputting a to-be-predicted image into the trained neural network model, and determining the category of the object included in the to-be-predicted.

20 Claims, 8 Drawing Sheets

(51) Int. Cl.
*G06T 7/11* (2017.01)
*G06T 7/174* (2017.01)
*G06N 20/10* (2019.01)
*G06N 3/08* (2006.01)
*G06T 5/50* (2006.01)
*G06T 7/00* (2017.01)

(52) U.S. Cl.
CPC ........... *G06K 9/6289* (2013.01); *G06N 3/084* (2013.01); *G06N 20/10* (2019.01); *G06T 5/50* (2013.01); *G06T 7/0002* (2013.01); *G06T 7/11* (2017.01); *G06T 7/174* (2017.01); *G06T 2207/20076* (2013.01); *G06T 2207/20081* (2013.01); *G06T 2207/20084* (2013.01); *G06T 2207/20132* (2013.01)

(56) References Cited

FOREIGN PATENT DOCUMENTS

| | | |
|---|---|---|
| CN | 106529558 A | 3/2017 |
| CN | 106874921 A | 6/2017 |
| CN | 107205162 A | 9/2017 |
| CN | 107292229 A | 10/2017 |
| CN | 107679525 A | 2/2018 |

OTHER PUBLICATIONS

Jose Ignacio Orlando et al., "Convolutional neural network transfer for automated glaucoma identification", Proc. SPIE 10160, 12th International Symposium on Medical Information Processing and Analysis, 101600U, Jan. 26, 2017 10 Pages.

\* cited by examiner

IMAGE CLASSIFICATION METHOD, SERVER, AND COMPUTER-READABLE STORAGE MEDIUM

CROSS REFERENCES TO RELATED APPLICATIONS

This application is a continuation application of PCT Patent Application No. PCT/CN2018/110664, filed on Oct. 17, 2018, which claims priority to Chinese patent application No. 201711060208.2, filed with the National Intellectual Property Administration, PRC on Nov. 1, 2017, and entitled "IMAGE CLASSIFICATION METHOD, SERVER, AND COMPUTER-READABLE STORAGE MEDIUM", the entire contents of both of which are incorporated herein by reference.

FIELD OF THE TECHNOLOGY

The present disclosure relates to image processing technologies, and in particular, to an image classification method, a server, and a computer-readable storage medium.

BACKGROUND OF THE DISCLOSURE

With the widespread application of multimedia technologies and computer device networks, a large amount of image data appears on the network. Effectively managing these image files and automatically identifying and categorizing the content of these images becomes increasingly important.

At present, convolutional neural network is an important algorithm in deep learning, and currently has become a research focus in the field of image recognition. An image classification technology based on the convolutional neural network can automatically extract feature information from an image and perform image classification by using the extracted feature.

For example, in the field of computer-assisted glaucoma diagnosis, some classification are performed based on manually extracted features which does not make full use of information in medical images; certain existing algorithms are relatively fixed so accuracy cannot be increased through the increase of training data. In addition, deep learning methods directed to glaucoma diagnosis does not have high accuracy because of limited training data. Further, an architecture of each layer of an existing network model is determined based on an architecture of a previous layer by using more training data, the method for training the network model is complex, and the network model obtained through training is not stable enough in terms of image classification accuracy. In addition, computer-assisted diagnosis directed to severity of glaucoma is not available.

SUMMARY

According to various embodiments of the present disclosure, an image classification method, a server, and a computer-readable storage medium are provided.

An image classification method performed on a server. The method includes: obtaining an original image and a category of an object included in the original image; adjusting a first display parameter of the original image to obtain an adjusted original image; and transforming a second display parameter of the original image to obtain a new image. The adjusted first display parameter satisfies a value condition; and the transformed second parameter of the new image satisfies a distribution condition. The method also includes training a neural network model based on the category of the included object and a training set constructed by combining the adjusted original image and the new image; and inputting a to-be-predicted image into the trained neural network model, and determining the category of the object included in the to-be-predicted.

A server, including a processor and a memory, the memory storing computer-readable instructions, the computer-readable instructions, when executed by the processor, causing the processor to perform the following operations: obtaining an original image and a category of an object included in the original image; adjusting a first display parameter of the original image to obtain an adjusted original image; and transforming a second display parameter of the original image to obtain a new image. The adjusted first display parameter satisfies a value condition; and the transformed second parameter of the new image satisfies a distribution condition. The operations also includes training a neural network model based on the category of the included object and a training set constructed by combining the adjusted original image and the new image; and inputting a to-be-predicted image into the trained neural network model, and determining the category of the object included in the to-be-predicted.

A non-transitory computer-readable storage medium storing computer-readable instructions, the computer-readable instructions, when executed by one or more processors, causing the one or more processors to perform the following operations: obtaining an original image and a category of an object included in the original image; adjusting a first display parameter of the original image to obtain an adjusted original image; and transforming a second display parameter of the original image to obtain a new image. The adjusted first display parameter satisfies a value condition; and the transformed second parameter of the new image satisfies a distribution condition. The operations also includes training a neural network model based on the category of the included object and a training set constructed by combining the adjusted original image and the new image; and inputting a to-be-predicted image into the trained neural network model, and determining the category of the object included in the to-be-predicted.

Details of one or more embodiments of the present disclosure are provided in the following accompanying drawings and descriptions. Other features and advantages of the present disclosure will become more obvious from the specification, the accompanying drawings, and the claims.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, the technical solutions, and the advantages of the present disclosure clearer, the following further describes the present disclosure in detail with reference to the accompanying drawings and the embodiments. It is to be understood that the specific embodiments described herein are merely used to explain the present disclosure, and are not intended to limit the present disclosure.

Unless otherwise defined, meanings of all technical and scientific terms used in this specification are the same as that usually understood by a person skilled in the technical field to which the present disclosure belongs. In this specification, the terms used in the specification of the present disclosure are merely intended to describe objectives of the specific embodiments, but are not intended to limit the present disclosure. The term "and/or" used in this specification includes any or all combinations of one or more related listed items.

Before the present disclosure is further described in detail, the terms used in the embodiments of the present disclosure are described. The following explanations apply to the terms used in the embodiments of the present disclosure.

(1) An object refers to the object used for classification in the present disclosure, such as a person or thing.

(2) A sample image is an image that includes an image of an object, such as an image in various digital formats such as JPEG.

(3) Image sharpening (also referred to as image enhancement) means enhancing an imaging characteristic of the object in the sample image through various means to increase the degree of difference between an imaging region of the object in the sample image and other region.

(4) A loss function is also referred to as a cost function, which is an objective function of neural network optimization.

(5) A neural network (NN) is a complex network system formed by a large number of simple processing units (referred to as neurons) widely connected to each other, which reflects a large quantity of basic features of the human brain function and is a highly complex non-linear dynamic learning system.

Embodiments of the present disclosure provide an image classification method, a server implementing the image classification method, and a storage medium storing an executable program for implementing the image classification method. For the implementation of the image classification method, the embodiments of the present disclosure provide a solution implemented on a terminal side and a server side, and an exemplary implementation scenario of image classification will be described.

Figure 1:
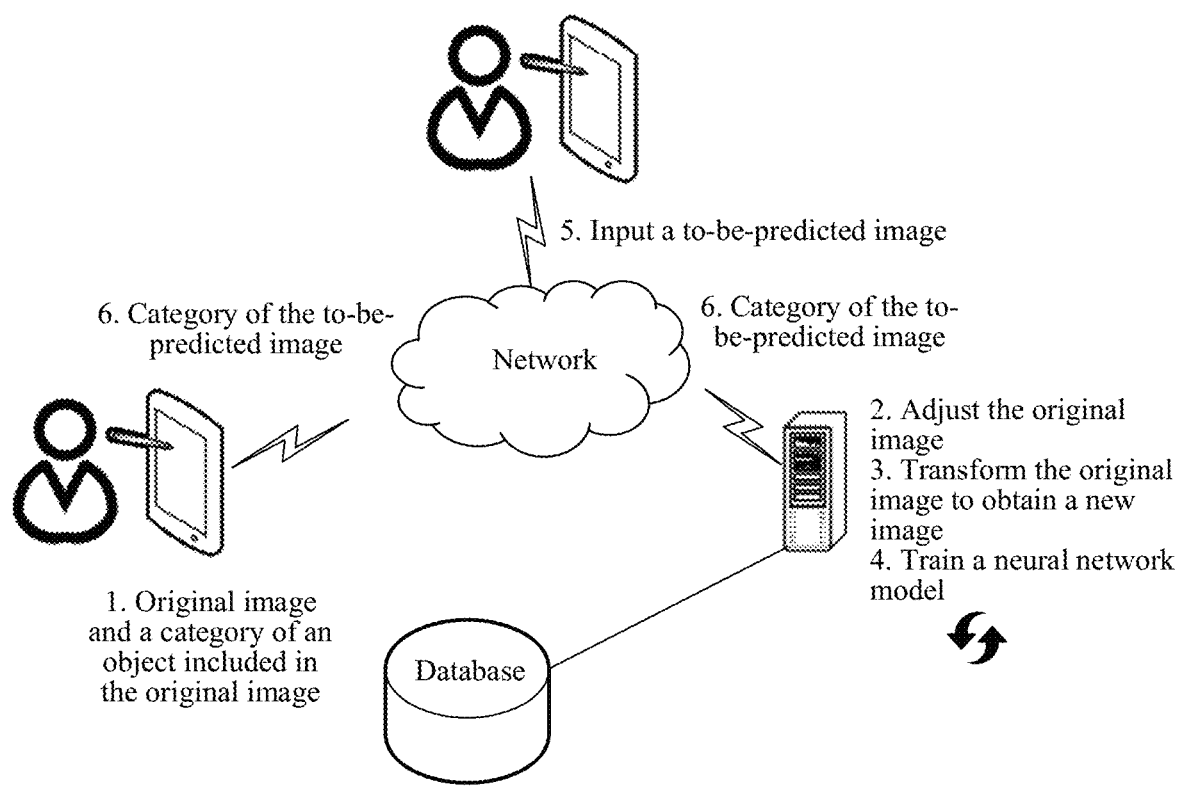
FIG. 1 is a schematic diagram of an application scenario of an image classification method according to an embodiment.

As shown in FIG. 1, FIG. 1 is a schematic diagram of an application scenario of an image classification method according to an embodiment of the present disclosure. A user installs an image classification application in a terminal, inputs a to-be-predicted image into the image classification application, and then sends the to-be-predicted image to a server. The server extracts a feature of the to-be-predicted image, extracts a feature of a reference image labeled with a category of an object, obtains a classification result after determining a category of the to-be-predicted image according to the extracted feature, and sends the classification result to the terminal. The image classification application may be an image classification application in which a neural network model is determined through neural network training for objects included in different images so that the obtained objects included in different images are respectively recognized to determine a category, and the reference image labeled with the category of the object may be an image in a training set for neural network training.

For example, the object included in an image is a human face. The image classification application is an image classification application in which a preset part (eyes or other parts) or a whole feature (all features constituting a face) of the human face included in the to-be-predicted image is recognized to determine a category. The category is a dimension for classifying a corresponding object included in the image. The classification dimension may be an external characteristic of the appearance of the object. Using the eye part as an example, the external characteristic may be phoenix eyes, triangular eyes, or the like. Alternatively, the classification dimension may be an inherent characteristic implied by the appearance of the object. Using the eye part as an example, the inherent characteristic may be personality, age, disease, or the like.

For example, an original image is an eye image, the object included in the original image is an eye, and the category of the object includes phoenix eyes, triangular eyes, willow eyes, fox eyes, and almond eyes. The user installs an image classification application in the terminal, and inputs a to-be-predicted eye image into the image classification application. The server obtains the to-be-predicted eye image, extracts shape features of eyes in the to-be-predicted eye image, determines an image in a training set for training a neural network model as a reference image, and extracts the shape features of the eyes in the reference image, to determine, according to a similarity between the extracted shape features and a corresponding shape feature during category determining during training of the neural network model, whether a category of the eye in the to-be-predicted eye image is phoenix eyes, triangular eyes, willow eyes, fox eyes, or almond eyes, and sends the category to the terminal.

For example, an original image is a fundus image, the object included in the original image is an eyeball, and the category of the object includes normal, early, advanced (medium), and late. The user installs an image classification application in the terminal, and inputs a to-be-predicted fundus image through the image classification application. The server acquires the to-be-predicted fundus image, extracts structure features of eyeballs in the to-be-predicted fundus image, determines an image in a training set for training a neural network model as a reference image, and extracts the structure features of the eyeballs in the reference image, to determine, according to a similarity between the extracted structure features and a corresponding structure feature during category determining during training of the neural network model, that a category of the eye in the to-be-predicted fundus image is normal, early, advanced (medium), and late, and sends the category to the terminal.

In the descriptions of the foregoing application scenarios, the example where the original image is the image of the eye in the local part of the human body is used, but the present disclosure is not limited thereto. For images in other fields or categories, the image classification method of some embodiments of the present disclosure may also be used to implement training of the neural network model and prediction of the category of the object included in the predicted image.

Figure 2:
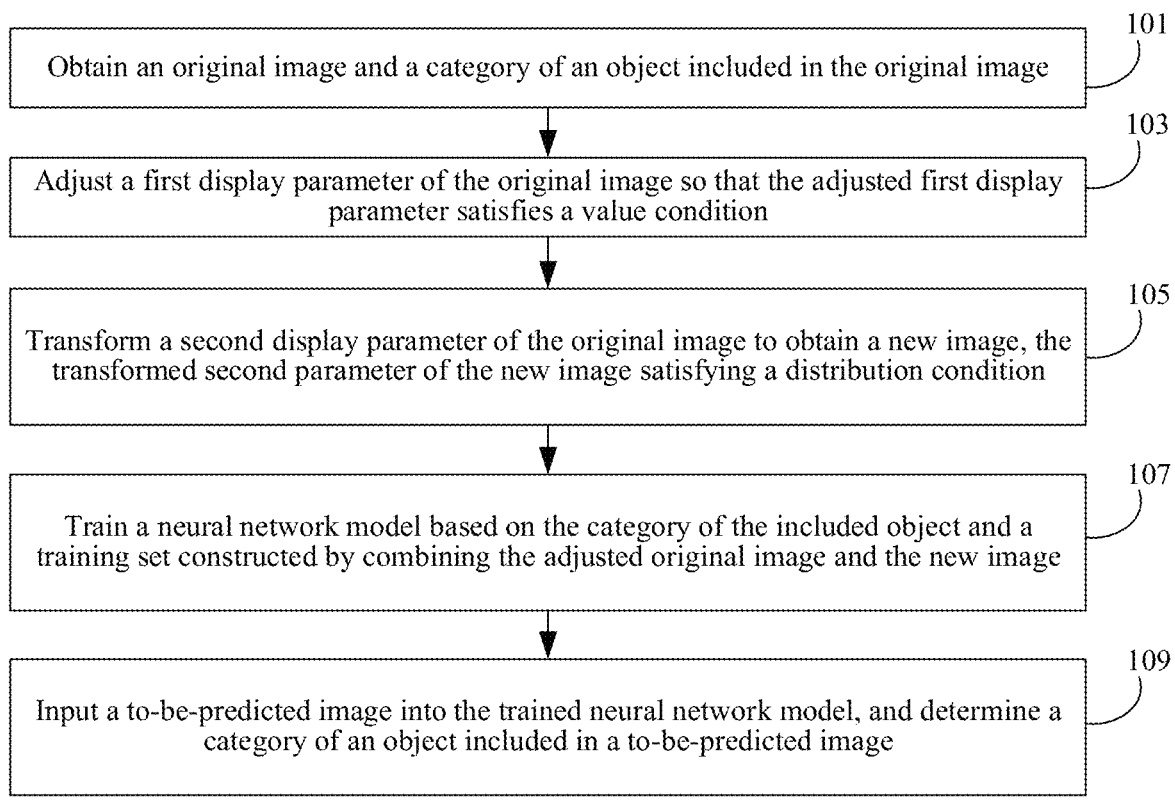
FIG. 2 is a flowchart of an image classification method according to an embodiment.

FIG. 2 is an optional schematic flowchart of an image classification method according to an embodiment of the present disclosure. Steps of the method will be described respectively.

Step 101: Obtain an original image and a category of an object included in the original image.

The original image is a picture captured or drawn for a target object whose category needs to be determined. The object is a target object whose category needs to be determined. The category of the object refers to dimensions that need to be used for classifying the target object. The category of the object included in the original image may be predetermined according to a requirement for classification of the target object. In a specific implementation, the original image may be collected from an image library currently publicly available on the Internet, and the category of the object included in the original image is specified according to a predetermined category.

Step 103: Adjust a first display parameter of the original image so that the adjusted first display parameter satisfies a value condition.

The display parameter of an image refers to numerical information that is carried by the image and that may be used for adjusting a display effect of the image. The display parameter generally includes resolution, dimensions, and a color. In some embodiments, the display parameter of the image mainly includes a direction, dimensions, brightness, contrast, an aspect ratio, resolution, a color, and the like of the image. The value condition is a numerical range preset respectively for a corresponding display parameter. The display parameter of the original image is adjusted to meet the corresponding preset numerical range, to improve image quality for training the neural network model, accelerate a training speed, and improve the accuracy.

Step 105: Transform a second display parameter of the original image according to a distribution condition that distribution of the display parameter needs to satisfy, to obtain a new image. In other words, a second display parameter of the original image may be transformed to obtain a new image, and the transformed second parameter of the new image satisfies a distribution condition. In some embodiments, the second display parameter of the original image may be transformed to obtain multiple new images, and the transformed second parameters of the multiple new image may be different and satisfy the distribution condition.

The display parameter refers to numerical information that is carried by the image and that may be used for adjusting a display effect of the image, mainly including a direction, dimensions, brightness, contrast, an aspect ratio, resolution, a color, and the like of the image. The distribution condition refers to a condition that needs to be satisfied and that is preset for different display parameters, such as average distribution, random distribution, and Gaussian distribution. The original image is transformed in real time according to a distribution condition that distribution of the display parameter needs to satisfy, to obtain more new images, implement data amplification, and increase training data used for training the neural network model.

Step 107: Train a neural network model based on the category of the included object and a training set constructed by combining the adjusted original image and the new image.

A training set is constructed by combining the adjusted original image with the new image, which may be a multi-batch training set constructed by combining the adjusted original image serving as a sample image, or may be a multi-batch training set constructed by combining the new image serving as a sample image, and may further be a multi-batch training set constructed by combining the adjusted original image and the new image serving as sample images. The training set is constructed by combining the adjusted original image and the new image, and in a case that there are very few original images that can obtain the category labeled with the object, a sufficient quantity of effective training sets may also be obtained to train the neural network model, thereby avoiding over-fitting in neural network training and obtaining higher training accuracy. For example, the training set is constructed by combining the adjusted original image and the new image in pairs. In one embodiment, before step 107 of training a neural network model based on the category of the included object and a training set constructed by combining the adjusted original image and the new image, the method further includes: constructing a training set by combining the adjusted original image and the new image in pairs. When a total quantity of the adjusted original image and the new image is N, and the training set is constructed by combining the adjusted original image and the new image in pairs, the quantity of sample data forming the training set is increased to $N*(N-1)$, thereby greatly increasing an amount of training data. Different batches of training sets constructed by combination are respectively input into the neural network model for training to form a plurality of iterations. For the same iteration, the adopted training set may be selected from a training set formed by combining original images or a training set formed by combining new images, so that in one iteration, data in the adopted training set is processed in the basically same manner, respectively. In this way, a training error caused by different image processing may be avoided, and training accuracy of the neural network model is improved. For different iterations, the adopted training set may be selected from either the training set formed by combining the original images or the training set formed by combining the new images.

The neural network model may be a neural network model obtained through pre-training based on a known image data set, and the neural network model may be a BP neural network model, a convolution neural network model, or a variation thereof.

Figure 3:
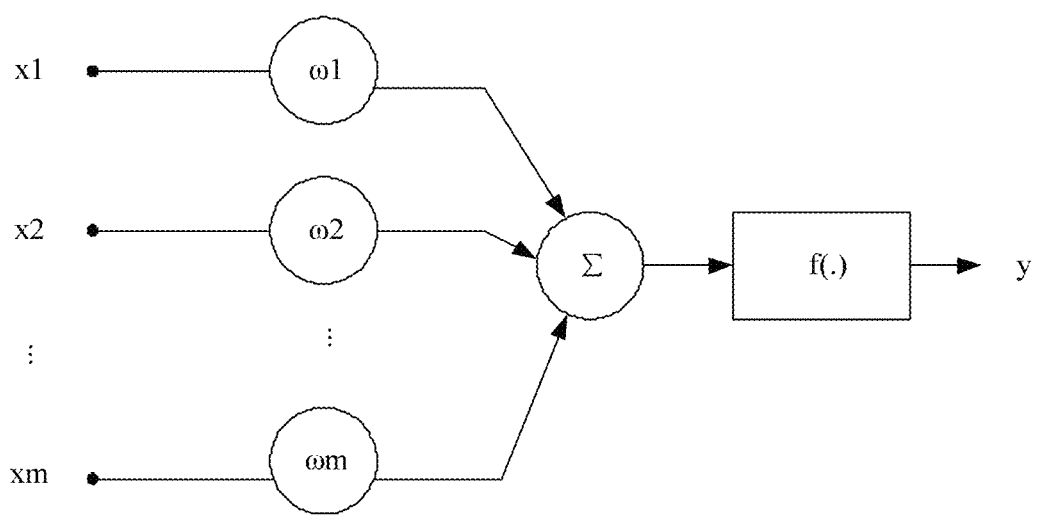
FIG. 3 is a schematic diagram of a neuron model of a BP neural network according to an embodiment.
Figure 4:
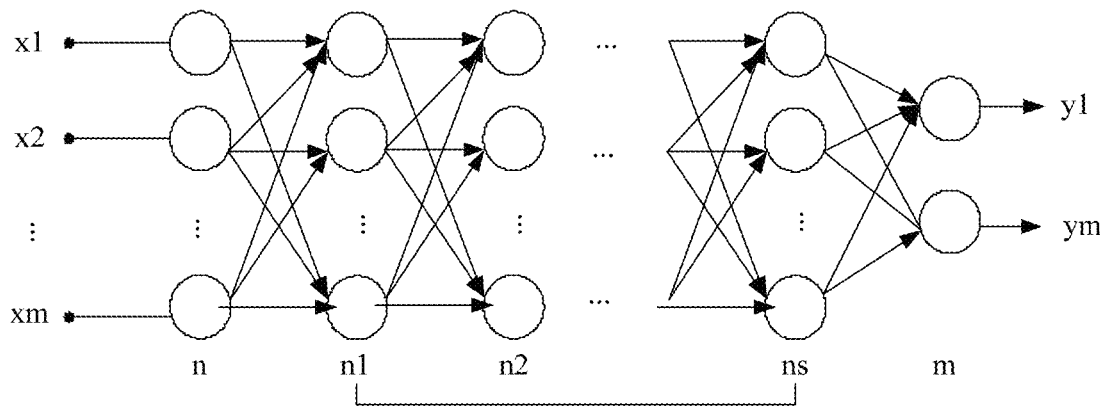
FIG. 4 is a schematic diagram of a BP neural network according to an embodiment.

A basic unit of a BP neural network is neurons. FIG. 3 is a schematic diagram of a typical neuron model, $x_1, x_2, \ldots, x_m$ indicating inputs, $\omega_1, \omega_2, \ldots, \omega_m$ indicating synaptic weights, $\Sigma$ indicating a summation node, $f(.)$ indicating an activation function, and y indicating an output. FIG. 4 is a schematic diagram of a neural network model formed by connecting a plurality of neurons according to a certain rule, n being an input volume, $n_1$-$n_s$ being intermediate layers, and m being an output volume. It may be learned from FIG. 3 and FIG. 4, the BP neural network model mainly includes an input volume, a hidden layer (an intermediate layer), and an output volume. A quantity of neurons in the input volume is the same as a quantity of dimensions of input data, a quantity of neurons in the output volume is the same as an amount of data to be fitted, and a quantity of neurons and a quantity of layers in the hidden layer are set according to an actual training target.

Figure 5:
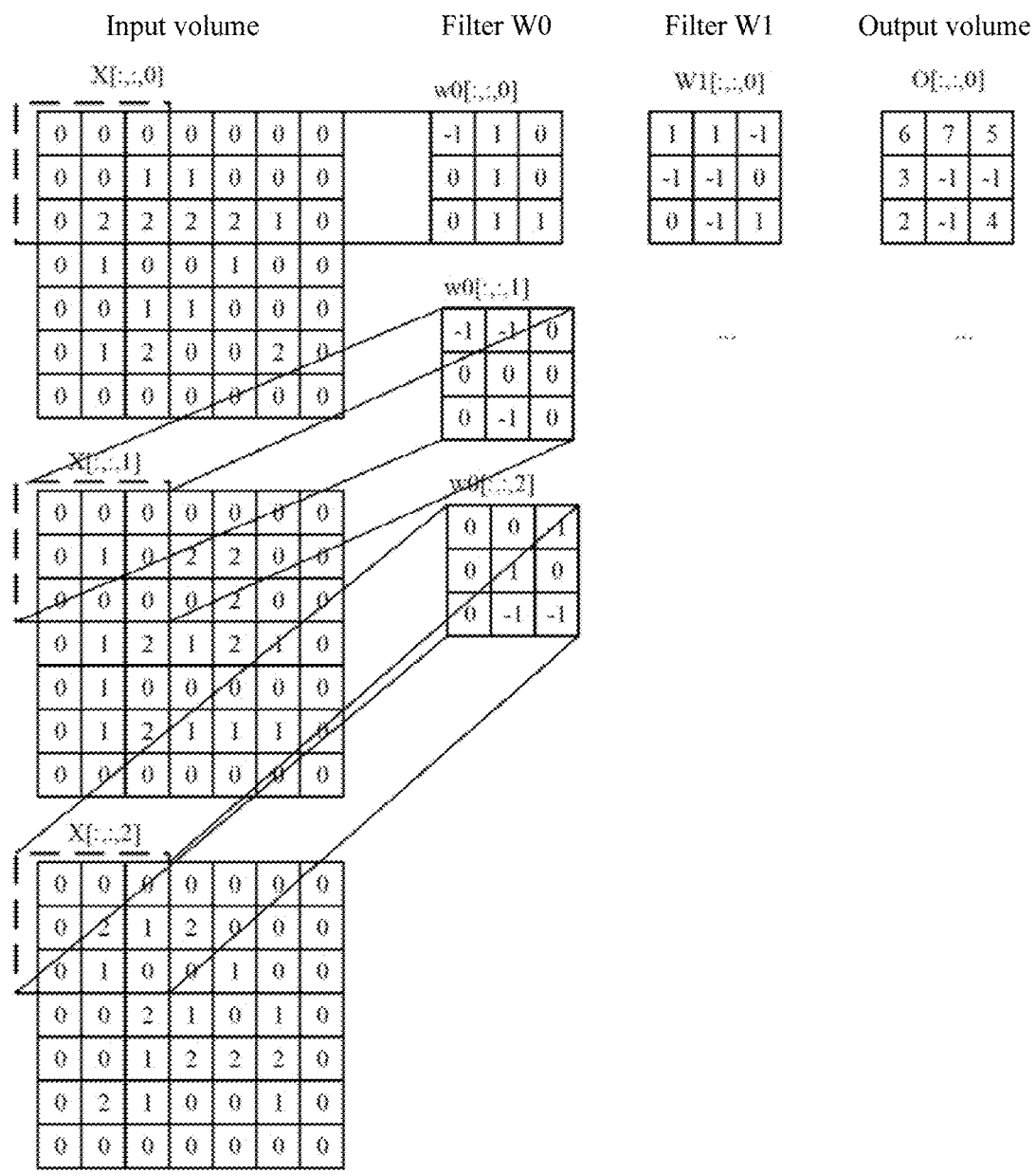
FIG. 5 is a schematic diagram illustrating an operation of a convolution layer of a convolutional neural network according to an embodiment.

A convolutional neural network is a deep learning architecture designed based on a biological natural visual cognitive mechanism, which mainly includes a convolutional layer, a pooling layer, and a fully connected layer. The convolution layer is the layer on which a convolution operation for an image is completed. The convolution operation means using a convolution kernel and a corresponding region of the image to perform convolution to obtain a value, and then continuously moving the convolution kernel and perform convolution to complete the convolution of the entire image. In the convolutional neural network, except the concept of convolution operation, calculation of convolutional layers usually includes concepts of depth and step size. A depth determines the quantity of neurons in the same region, that is, several convolution kernels perform convolution operations on the same region, and the step size is a quantity of pixels moved by the convolution kernel. FIG. 5 is a schematic diagram of a convolution operation of a convolution layer by using an example that a height and a width of the input volume are both 7*7, the depth is 3, and a height and a width of each of two filters are both 3*3, the depth is 3, and the size of the convolution kernel is 3*3. The leftmost input volume and the first filter (Filter W0) are calculated, the first layer of the input volume and the first layer of Filter W0 are calculated, the second layer of the input volume and the second layer of Filter W0 are calculated, and the third layer of the input volume and third layer of Filter W0 are calculated. Finally, results of the three layers are accumulated to obtain the first result matrix of the output volume. In this way, the leftmost input volume and the second filter (Filter W1) are calculated to obtain the second result matrix of the output volume. The pooling layer is located between the convolution layers, and is used for compressing a preset block region of the input data of the previous layer into a value, thereby gradually reducing the data amount and a quantity of convolution parameters and reducing the phenomenon of overfitting.

Figure 6:
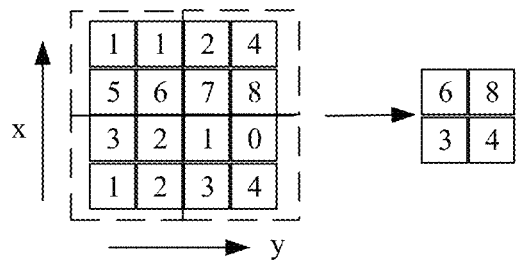
FIG. 6 is a schematic diagram of a pooling layer of a convolutional neural network according to an embodiment.

As shown in FIG. 6, FIG. 6 is a schematic diagram illustrating an operation of the pooling layer, where a maximum value in the 2*2 region is used for the pooling layer to represent the entire region. The fully connected layer is mainly used for learning, and maps distributed feature representations in the learned training set to sample label space to obtain a weight of the neural network model.

Training a neural network model mainly includes loading a training set and training a model parameter. Loading the training set is inputting a training set constructed based on the adjusted original image and the new image structure and a category of an included object into an initial neural network model for iterative training, calculating a cost through forward conduction, label information and a cost function, and updating parameters in each layer through backpropagation of a gradient of the cost function, to adjust the weight of the initial neural network model until the loss function of the neural network model meets a convergence condition to obtain a trained neural network model.

Step 109: Based on the trained neural network model, input a to-be-predicted image and a reference image labeled with a category of an object into the neural network model, and determine a category of an object included in a to-be-predicted image.

The to-be-predicted image and the reference image labeled with the category of the object are input into the trained neural network model, that is, the to-be-predicted image and the reference image labeled with the category of the object are combined as an input of the neural network model. The reference image labeled with the category of the object may be an image in the training set, and may specifically be an original image or a new image. A corresponding feature included in the to-be-predicted image and a corresponding feature included in the reference image are captured through the neural network model, and a probability that the object included in the to-be-predicted image belongs to a corresponding category is determined through a degree of similarity between the extracted feature and features of images that correspond to different categories and that are mapped to sample label space during model training, thereby determining the category of the object included in the to-be-predicted image.

According to the image classification method provided in some embodiments of the present disclosure, the display parameter of the original image is adjusted to satisfy the value condition by acquiring the original image and the category of the object included in the original image, to obtain an adjusted original image. The display parameter of the original image is transformed according to the distribution condition that distribution of the display parameter needs to satisfy, to obtain a new image, and then a training set is constructed by combining the adjusted original image and the new image. Therefore, a more effective training set used for training the neural network model and having an exponentially increased quantity of samples may be constructed. In a case that there are very few original images professionally labeled with the object category for the same field or category, stable classification accuracy may also be obtained. During training based on the category of the included object and the training set constructed by combining the adjusted original image and the new image, training may be performed based on a known neural network model, the trained neural network model is obtained after the weight is updated to predict the to-be-predicted image, and the training method is simpler.

In another implementation, step 103 of adjusting a display parameter of the original image so that the adjusted display parameter satisfies a value condition includes: detecting an imaging region of an object included in the original image; and adjusting dimensions of the original image to be consistent with dimensions of the imaging region of the object.

The dimensions are used as the display parameter of the original image, and the dimensions of the imaging region of the object are used as the value condition. The dimensions of the original image are adjusted to be consistent with the dimensions of the imaging region of the included object, so that dimensions of objects included in the original image are consistent. For example, the original image is the fundus picture and the object included in the original image is the eyeball. The imaging region of the object refers to an imaging region of the eyeball. Dimensions of an original fundus picture are adjusted, so that eyeballs in different original fundus pictures have the same dimensions such as 300 pixels. Through adjustment, the dimensions of the original image are consistent with the dimensions of the imaging region of the object, thereby unifying the dimensions of the objects included in the original picture, to avoid affecting the training accuracy due to small object dimensions during subsequent training of the neural network model, and avoid a training error as a result of different object dimensions.

In still another implementation, the value condition may be a recognition degree, step 103 of adjusting a display parameter of the original image so that the adjusted display parameter satisfies a value condition includes: performing image enhancement processing on each color channel of the original image based on the recognition degree, to obtain the adjusted original image.

Image enhancement means enhancing useful information in an image to improve a visual effect of the image. The color channel is a channel that saves color information of the image. Each image has one or more color channels. Each color channel is used for storing information about a color element in the image. The colors in all color channels are superimposed and mixed to generate a color of a pixel in the image. The recognition degree refers to a degree to which an image can be recognized. An image enhancement method may include the following methods. First, a contrast increasing method is transforming a grayscale value of the image using a linear function. Second, a Gamma correction method is transforming the grayscale value of the image using a non-linear function (an exponential function). Third, a histogram equalization method is converting a histogram of the original image into an image with probability density of 1 (if ideal) through an integrated probability density function, and increasing the contrast, to achieve widening of a specific region through histogram equalization, so that the entire image is transformed to a bright region. Fourth, a histogram standardization method is converting the histogram of the original image into a form of the specified histogram according to a result of histogram equalization, determining a histogram of a target image by referring to the histogram of the original image, and obtaining the histogram using a Gaussian function. Fifth, a homomorphic filter is provided. A grayscale image f(x, y) may be regarded as two parts of an incident light component i(x, y) and a reflected light component r (x, y): f(x, y)=i(x, y)*r(x, y). Incident light is relatively uniform, changes little as a spatial position changes, and occupies a low-frequency component segment. Reflected light reflects light with different strength due to different properties and structural characteristics of the object, occupies a higher-frequency component as the spatial position changes greatly, and is designed based on a principle that an image is formed by combining a light spectrum and a reflection spectrum. Sixth, a color image enhancement method based on HSV space is converting an RGB image into images in other spaces, for example, converting an image in an RGB space into an image in HSV space. HSV refers to hue, saturation, and brightness, respectively, and three variables of HSV are adjusted for enhancement.

Through the foregoing first to third methods, an image region of interest, that is, the imaging region of the object whose feature needs to be extracted, may be widened, and the region of no interest, that is, a background region without needing to extract a feature, may be compressed to achieve an effect of image enhancement. The foregoing first to fifth methods are suitable for performing image enhancement processing on a grayscale image, and the sixth method is suitable for performing image enhancement processing on a color image.

In some embodiments of the present disclosure, a color channel is used as the display parameter of the image, and a preset recognition degree that needs to be met is used as the value condition. Each color channel of the original image is enhanced by using an image enhancement method, thereby emphasizing overall or local features of the image to make an originally unclear image clear and emphasizing the feature that needs to be extracted to enlarge a difference between different features in the image. In the process of enhancing each color channel of the original image by using the image enhancement method, in the image enhancement method, one or more of the first to sixth image enhancement methods may be selected for combination as required. For example, in a specific embodiment, the original image is a fundus image, for example. In order to highlight an optic disc cup to disc ratio (CDR) in the fundus image, the performing image enhancement processing on each color channel of the original image based on a recognition degree that the original image needs to satisfy includes: performing steps S1 to S2 for each color channel of each pixel in the original image. S1. Multiply a color value of each color channel of each pixel by a preset value; S2. Add each pixel to a grayscale value of a preset ratio. A difference value between the color value of each color channel of each pixel and a color value within a preset pixel region range is acquired and multiplied by the preset value, so that a degree of difference between the pixels may be increased, and a training speed of the image for training a neural network model may be accelerated. A value range of the preset value may be [1-8], preferably 3, and a value of the grayscale value of the preset ratio may be in a range of 58% to 59%, specifically 150. Through steps S1 to S2, image enhancement processing is performed on each color channel of the original image, which may suppress the feature that does not need to be extracted, to improve image quality, enrich an amount of information, and improve an effect of determining and recognizing the original image.

In yet another implementation, step 103 of adjusting a display parameter of the original image so that the adjusted display parameter satisfies a value condition includes: cropping a non-imaging region of the object in the original image; and adjusting the cropped image to preset dimensions.

Cropping is an action of acquiring a required local part from the whole. Dimensions are used as the display parameter of the original image, that overall dimensions of the image conform to preset dimensions are used as a value condition, and a non-imaging region of the original image is cropped so that dimensions of the original image are consistent with the preset dimensions. For example, the original image is a fundus picture and an object included in the original image is an eyeball. An imaging region of the object refers to an imaging region of the eyeball, and a non-imaging region outside the eyeball included in an original fundus picture is cropped, to adjust overall dimensions of the cropped original fundus picture to be consistent with the preset dimensions, thereby unifying dimensions of the imaging region of the object included in the original image, reducing an area of a no-information region in the original image, and improving a training speed and accuracy of the original image for training the neural network model. For example, the original image is the fundus picture and the object included in the original image is an optic disc and an optic cup. The imaging region of the object refers to an imaging part of the optic disc and the optic cup. Cropping is performed using the optic disc and the optic cup as a center, so that dimensions of the optic disc and the optic cup in the cropped original fundus picture are consistent with the preset dimensions.

In another embodiment, step 105 of transforming the display parameter of the original image according to a distribution condition that distribution of the display parameter needs to satisfy, to obtain a new image includes: determining, according to a value space corresponding to a category of the display parameter and a distribution condition associated with the value space, an image transformation configuration for transforming the display parameter of the original image; and transforming the display parameter of the original image according to the image transformation configuration, to obtain a new image.

The display parameter of at least one category of the image may refer to at least one of a direction, dimensions, brightness, contrast, an aspect ratio, resolution, and a color of the image. Value space refers to a value range corresponding to different categories of the display parameter. The value space is set for different categories of the display parameter, an image transformation configuration is set based on the value space and distribution conditions of different display parameters, thereby obtaining more new images that may be used for training a neural network model.

For example, the category of the display parameter is the direction of the image, the corresponding value space is horizontal flipping or flipping at 90 degrees, and the distribution condition is even distribution. Step 105 of transforming the display parameter of the original image according to a distribution condition that distribution of the display parameter needs to satisfy, to obtain a new image specifically includes: according to the direction of the original image included in the round of training data, using the average distribution as the distribution condition, and horizontally flipping the original image with a 50% probability or at 90 degrees, to obtain a new image to form a new round or more round of training data.

For example, the category of the display parameter is the aspect ratio of the image, the corresponding value space is a range of a cropping ratio for a length or a width, and the distribution condition is random distribution. Step 105 of transforming the display parameter of the original image according to a distribution condition that distribution of the display parameter needs to satisfy, to obtain a new image includes: according to the range of the cropping ratio for the aspect ratio of the original image included in the round of training data, using the random distribution as the distribution condition, and randomly cropping the length or width of the original image at an arbitrary ratio within the range of the cropping ratio, to obtain a new image to form a new round or more round of training data. Specifically, the length and width of the original image may be randomly cropped from 0% to 15% based on an initial length and width, respectively.

For example, the category of the display parameter is the brightness of the image, the corresponding value space is a brightness increase/decrease value range of the image, and the distribution condition is random distribution. Step 105 of transforming the display parameter of the original image according to a distribution condition that distribution of the display parameter needs to satisfy, to obtain a new image specifically includes: according to the brightness increase/decrease value range for brightness adjustment of the original image included in the round of training data, using the random distribution as the distribution condition, and randomly increasing the brightness of the original image at a brightness value within the brightness increase/decrease value range, to obtain a new image to form a new round or more round of training data. Specifically, the brightness of the original image may be added to an arbitrary brightness value within the brightness increase/decrease value range, and the brightness increase/decrease value is in a range of negative 10 candela/square meter and 10 candela/square meter ($cd/m^2$).

For example, the category of the display parameter is the brightness of the image, the corresponding value space is a brightness increase/decrease ratio range of the image, and the distribution condition is random distribution. Step 105 of transforming the display parameter of the original image according to a distribution condition that distribution of the display parameter needs to satisfy, to obtain a new image specifically includes: according to the brightness increase/decrease ratio range of the original image included in the round of training data, using the random distribution as the distribution condition, and randomly increasing the brightness of the original image at a ratio within the brightness increase/decrease ratio range, to obtain a new image to form a new round or more round of training data. Specifically, the brightness of the original image may be adjusted to 75% to 125% of the initial brightness.

For example, the category of the display parameter is the contrast of the image, the corresponding value space is a contrast increase/decrease ratio range of the image, and the distribution condition is random distribution. Step 105 of transforming the display parameter of the image according to a distribution condition that distribution of the display parameter needs to satisfy, to obtain a new image includes: according to the contrast increase/decrease ratio range for brightness adjustment of the original image included in the round of training data, using the random distribution as the distribution condition, and randomly increasing the brightness of the original image at a brightness value within the contrast increase/decrease ratio range, to obtain a new image to form a new round or more round of training data. Specifically, the contrast of the original image may be adjusted to 75% to 125% of the initial brightness.

For example, the category of the display parameter is the dimensions of the image, the corresponding value space may be a scaling ratio range of the image, and the distribution condition is random distribution. Step 105 of transforming the display parameter of the original image according to a distribution condition that distribution of the display parameter needs to satisfy, to obtain a new image specifically includes: according to the scaling ratio range of the original image included in the round of training data, using the random distribution as the distribution condition, and randomly enlarging the original image at a ratio within the scaling ratio range, to obtain a new image to form a new round or more round of training data. Specifically, the scaling ratio range of the original image may be adjusted to 90% to 110% of an original size.

For example, the category of the display parameter is the direction of the image, the corresponding value space is a range of directions in which the image is rotated, and the distribution condition is random distribution. Step 105 of transforming the display parameter of the original image according to a distribution condition that distribution of the display parameter needs to satisfy, to obtain a new image specifically includes: according to the range of directions in which the original image is rotated and included in the round of training data, using the random distribution as the distribution condition, and randomly enlarging the original image at a ratio within the rotating direction range, to obtain a new image to obtain a new round or more round of training data. Specifically, the direction of the original image may be based on an initial direction and randomly rotated at any angle within a range of rotation directions, and the rotation direction is in a range of negative 180 degrees and 180 degrees.

It may be understood that according to the distribution condition that the distribution of the display parameter needs to satisfy, in the step of transforming the display parameter of the original image to obtain a new image, the category of the display parameter is not limited to the category given in the foregoing embodiments. In addition, when the original image is transformed to obtain a new image, one or a combination of a plurality of technical means for transforming the image in the foregoing embodiment may be adopted, and any of the following augmentation operations is randomly performed for each round of training data. 1. Horizontally flip the training image with a preset probability value; 2. Randomly crop a width and a height of the original image based on a first ratio range value; 3. Randomly perform addition/subtraction operation on brightness of the original image based on a second ratio range value; 4. Randomly perform multiplication/division operation on brightness of the original image based on a third ratio range value; 5. Randomly perform multiplication/division operation on contrast of the original image based on a fourth ratio range value; 6. Randomly scale a width and a height of the original image based on a fifth ratio range value; 7. Randomly rotate the original image based on a sixth ratio range value. A real-time data augmentation operation is performed on each round of training data, thereby obtaining more rounds of effective training data for training the neural network model.

In an embodiment, the training a neural network model includes: initializing the neural network model; and initializing a distance calculation layer, a fully connected layer, and a classification layer that are sequentially connected to the neural network model, to obtain a combined neural network model for classifying the to-be-predicted image, and inputting an image included in the training set and a corresponding category into the combined neural network model for iterative training until a loss function of the combined neural network model satisfies a convergence condition.

The initializing the neural network model means initializing a parameter of any existing neural network model, to build an initial neural network model. The neural network model is trained according to a training set constructed by combining the adjusted original image and a new image, and the distance calculation layer, the fully connected layer, and the classification layer that are sequentially connected to the neural network model are initialized to build an initial combined neural network model. The initializing a parameter of the neural network model mainly includes initializing a connection parameter, that is, a weight of an edge in a neural network, between layers in the neural network model. Optionally, the initializing a parameter of the neural network model may further include: initializing a quantity of iterations in the neural network model, a batch processing size, a learning rate, a quantity of neural network layers, and the like.

In some embodiments of the present disclosure, the initial neural network model may be a pre-trained neural network model based on a pre-trained image data set, for example, convolutional neural network models such as Inception V1, Inception V2, Inception V3, Inception V4 that are obtained through pre-training based on pre-trained image data sets such as ImageNet, resNet, VGG, and DenseNet. Certainly, the initial neural network model used in the initialization neural network model is not limited thereto, or may be any existing neural network model pre-trained based on other pre-trained image data sets, and the initial neural network model is built by using the parameter of the neural network model pre-trained based on the pre-trained image data set.

The initial combined neural network model is built based on the initial neural network model. Specifically, the initial combined neural network model is built through the distance calculation layer, the fully connected layer, and the classification layer that are sequentially connected to the initial neural network model. The distance calculation layer refers to a layer used for performing distance measure on features of different images in the neural network model. The distance calculation layer calculates a distance between features of different extracted images by using a set distance measure method, to evaluate a correlation degree of the features. The main distance measure method includes: an L1 distance (Manhattan distance) method, an L2 distance (Euclidean distance, Euclidean measure) method, an L∞ distance (Chebyshev Distance) method, and the like. $X_{ik}$ represents a Kth first feature, $X_{jk}$ represents a Kth second feature, $d_{ij}$ represents a distance between a first feature and a second feature, and n represents a quantity of features. The formula for calculating the L1 distance is: $d_{ij}=\Sigma_{k=1}^{n}(|X_{ik}-X_{jk}|)$ The formula for calculating the L2 distance is: $d_{ij}=\sqrt{\Sigma_{k=1}^{n}(X_{ik}-X_{jk})^2}$; The formula for calculating the L∞ distance is: $d_{ij}=\max_{k}(|X_{ik}-X_{jk}|)$. The distance measure method used in the distance calculation layer in the neural network model provided in some embodiments of the present disclosure is not limited to the foregoing method, and any other existing distance measure method used for calculating the distance between features of different images may be used. The fully connected layer is used for being connected to all nodes in the distance calculation layer, distance vector features output by the distance calculation layer are synthesized, and dimension reduction processing is performed. The classification layer refers to a layer that determines, based on a distance calculation result of the extracted features, a similarity between a feature extracted from a corresponding to-be-predicted image and a feature extracted from a reference image labeled with a category to determine a category. It may be understood that a quantity of classifications implemented through an excitation function used by the classification layer corresponds to a quantity of inputs in the training set for training the initial combined neural network model, that is, corresponds to a combination method in which the training set is constructed by combining the adjusted original image and a new image. In some embodiments, for example, the training set is constructed by combining the adjusted original image and the new image in pairs. Two inputs in the training set for training the initial combined neural network model are correspondingly formed, and the classification layer is a layer that uses a sigmoid function as the excitation function to achieve binary classification.

The image included in the training set and a corresponding category are input into the initial combined neural network model for iterative training until a loss function of the combined neural network model satisfies a convergence condition, to obtain a final combined neural network model used for classifying the to-be-predicted image. In the implementation of obtaining the combined neural network model, the initializing a distance calculation layer, a fully connected layer, and a classification layer that are sequentially connected to the initial neural network model to obtain an initial combined neural network model used for classifying the to-be-predicted image specifically includes: building an initial combined neural network model by sequentially connecting an average pooling layer of the initial neural network model to the distance calculation layer, the fully connected layer, and the classification layer.

During training of the neural network model, after the combined neural network model is initialized, the method mainly further includes loading a training set and training a model parameter. Loading the training set is inputting a training set constructed based on the adjusted original image and the new image structure and a category of an included object into an initial combined neural network model for iterative training, calculating a cost through forward conduction, label information and a cost function, and updating parameters in each layer through backpropagation of a gradient of the cost function, to adjust a weight of the initial combined neural network model until the loss function of the neural network model meets a convergence condition to obtain a final combined neural network model. The initial neural network model refers to a neural network model pre-trained based on a pre-trained image data set. The initial combined neural network model refers to a quantity of inputs formed by the training set constructed by combining the adjusted original image and the new image, and a neural network model that is prior to training and constructed by the initial combined neural network model. The final combined neural network model refers to a neural network model after training. In this way, based on the neural network model pre-trained through a pre-trained image data set, a characteristic of a feature of a to-be-predicted image is extracted through an intermediate layer of the neural network model pre-trained based on the pre-trained image data set, to construct the combined neural network model for classifying the to-be-predicted image, so that the neural network model may be constructed more simply, the training method is simpler, and stable classification accuracy can be quickly obtained.

In another embodiment, the image classification method further includes: obtaining a loss function of a neural network model according to a cross-entropy cost function.

The loss function, also referred to as a cost function, is an objective function of neural network optimization. A process of neural network training or optimization is a process of minimizing the loss function. A smaller loss function value leads to a corresponding prediction result closer to a value of a true result. In a specific embodiment, the loss function of the neural network model is formed according to the cross-entropy cost function. When an actual output value is closer to an expected output value, the cost function is closer to zero. When a sigmoid function is used as an activation function of a neuron, the cross-entropy cost function is used as the loss function of the neural network model, so that the training speed may be increased.

In an embodiment, step 109 of inputting, based on the trained neural network model, a to-be-predicted image into the neural network model, and determining a category of an object included in the to-be-predicted image includes:

in a combined neural network model, extracting, using the combined neural network model, an image feature of the to-be-predicted image and an image feature of a reference image comprising an object of labeled category, the reference image being an image in the training set;

determining a distance vector between the image feature of the to-be-predicted image and the image feature of the reference image, and performing down-sampling processing on the distance vector; and mapping the down-sampled distance vector to a specific value space to obtain a probability that the to-be-predicted image belongs to the labeled category corresponding to the reference image.

The reference image labeled with the category of the object refers to an image with the object included in the image the same as the object included in the to-be-predicted image and that is labeled with a corresponding included category. In an embodiment, the reference image refers to an image in a training set used during training of the neural network model, and may specifically be an adjusted original image or a new image in some embodiments of the present disclosure. It may be understood that the reference image is also another image that may meet the foregoing requirement, for example, a newly added image labeled with a corresponding category based on a pre-trained image data set. For the combined neural network model, the image feature is extracted using the neural network model pre-trained through the pre-trained image data set. Specifically, the image feature of the to-be-predicted image and the image feature of the reference image labeled with the category of the object are extracted. The distance between the image feature of the to-be-predicted image and the image feature of the reference image is calculated through the distance calculation layer to obtain a distance vector, down sampling is performed, through the fully connected layer, on the distance vector obtained from the extracted image feature, the feature after down sampling, that is, a distance vector after dimension reduction is input into the classification layer with the excitation function as a sigmoid function, and the distance vector is mapped to a specific value space (0, 1) through the classification layer, to obtain a probability that the to-be-predicted image belongs to the category of the object labeled for the reference image, thereby obtaining a classification result of the to-be-predicted image.

Figure 7:
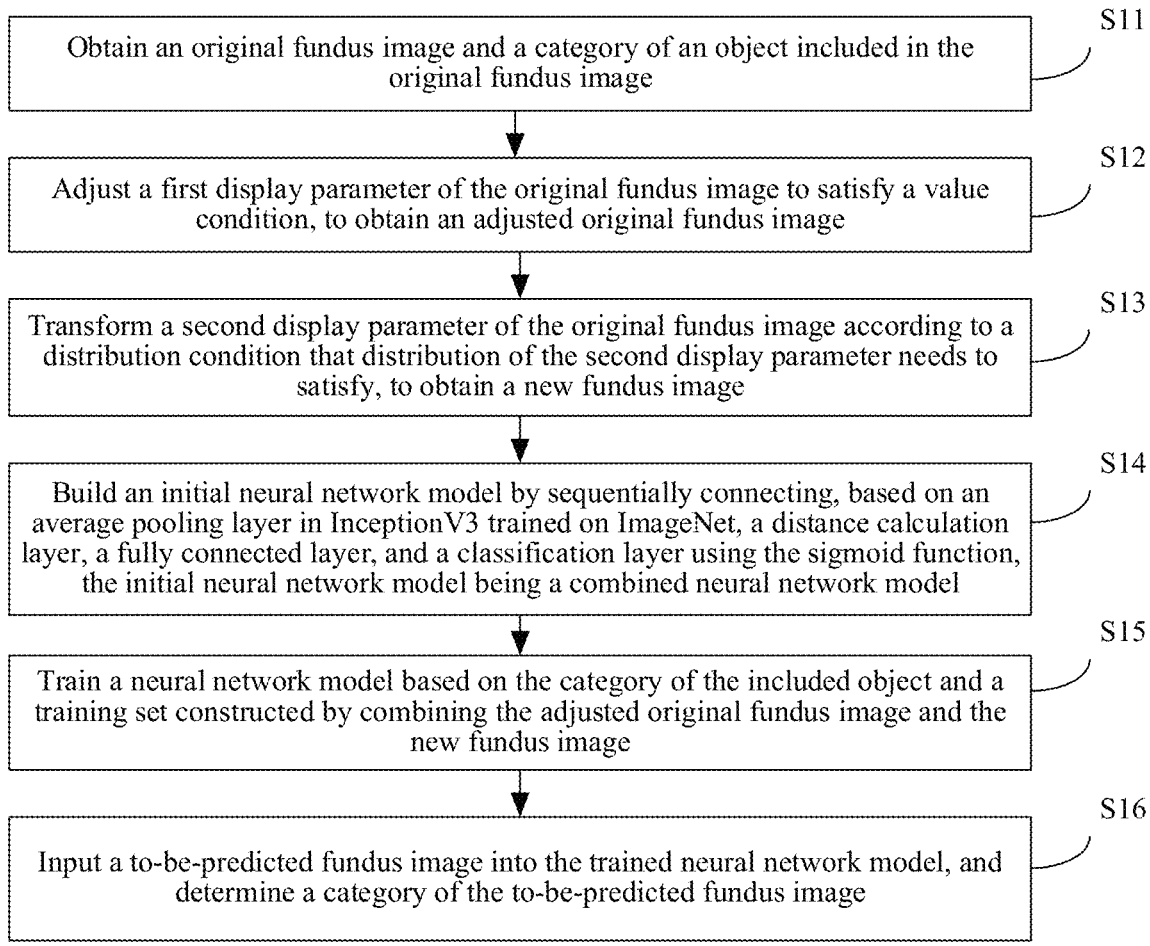
FIG. 7 is a flowchart of an image classification method according to a specific embodiment.

Reference is made to FIG. 7, in which an original image is used as a fundus image, Inception V3 pre-trained based on a pre-trained image data set ImageNet is an initial neural network model, and a combined neural network model is constructed and trained. The image classification method provided in some embodiments of the present disclosure is described as follows.

S11. Obtain an original fundus image and a category of an object included in the original fundus image. As an optional solution, the category of the object includes four categories that may assist in recognizing features of different degrees of retinopathy of an eyeball, including: normal, early, advanced (medium), and late.

S12. Adjust a display parameter of the original fundus image to satisfy a value condition, to obtain an adjusted original fundus image. As an optional solution, the adjusting a display parameter of the original fundus image to satisfy a value condition includes: scaling the original fundus image so that an eyeball in the original fundus image have the same radius, such as 300 pixels; subtracting a preset pixel value within a preset pixel region range from each channel of each pixel in the original fundus image, multiplying each pixel value by a preset fixed value, and then adding each pixel value to a grayscale value at a preset ratio; cropping a non-imaging no-information region of the original fundus image; and scaling the original fundus image to a preset size, such as 299 pixels wide and 299 pixels high. In this way, a part of a preset imaging structure in the original image, such as parts of blood vessels and bleeding points in the original fundus image, may be highlighted. As another optional solution, the adjusting a display parameter of the original fundus image to satisfy the other a value condition includes: scaling the original fundus image so that the original fundus image has the same dimension, such as 589 pixels wide and 589 pixels high; detecting a region in which an optic disc and an optic cup are located in the original fundus image, performing cropping with a center of the optic disc and the optic cup as a center, and cropping the non-imaging no-information region of the original fundus image to an appropriate dimension, such as 299 pixels wide and 299 pixels high; performing enhancement processing on the image, subtracting a preset pixel value within a preset pixel region range from each channel of each pixel in the original fundus image, multiplying each pixel value by a preset fixed value, and then adding each pixel value to a grayscale value at a preset ratio, for example, performing the following processing on each channel of each pixel in the original fundus image: $g(i, j)=\alpha*f(i, j)+\beta$, i, j are locations of pixels, f (i, j) are values of the pixels before processing, g(i, j) are values of the pixels after processing, $\alpha$, and $\beta$ are preset parameter values, respectively, for example, a value of $\alpha$ is 3, and a value of $\beta$ is 150. In this way, contrast of different preset imaging structures of the original image, such as an optic disc cup to disc ratio of the original fundus image, may be highlighted.

S13. Transform the display parameter of the original fundus image according to a distribution condition that distribution of the display parameter needs to satisfy, to obtain a new fundus image. As an optional solution, the method of transforming the display parameter of the original fundus image according to a distribution condition that distribution of the display parameter needs to satisfy includes at least one of the following: horizontally flipping the original fundus image or the new fundus image with a preset probability value; randomly cropping a width and a height of the original fundus image based on a first ratio range value; randomly performing addition/subtraction operation on brightness of the original fundus image based on a second ratio range value; randomly performing multiplication/division operation on brightness of the original fundus image based on a third ratio range value; randomly performing multiplication/division operation on contrast of the original fundus image based on a fourth ratio range value; randomly scaling a width and a height of the original fundus image based on a fifth ratio range value; and randomly rotating the original fundus image based on a sixth ratio range value.

Figure 8:
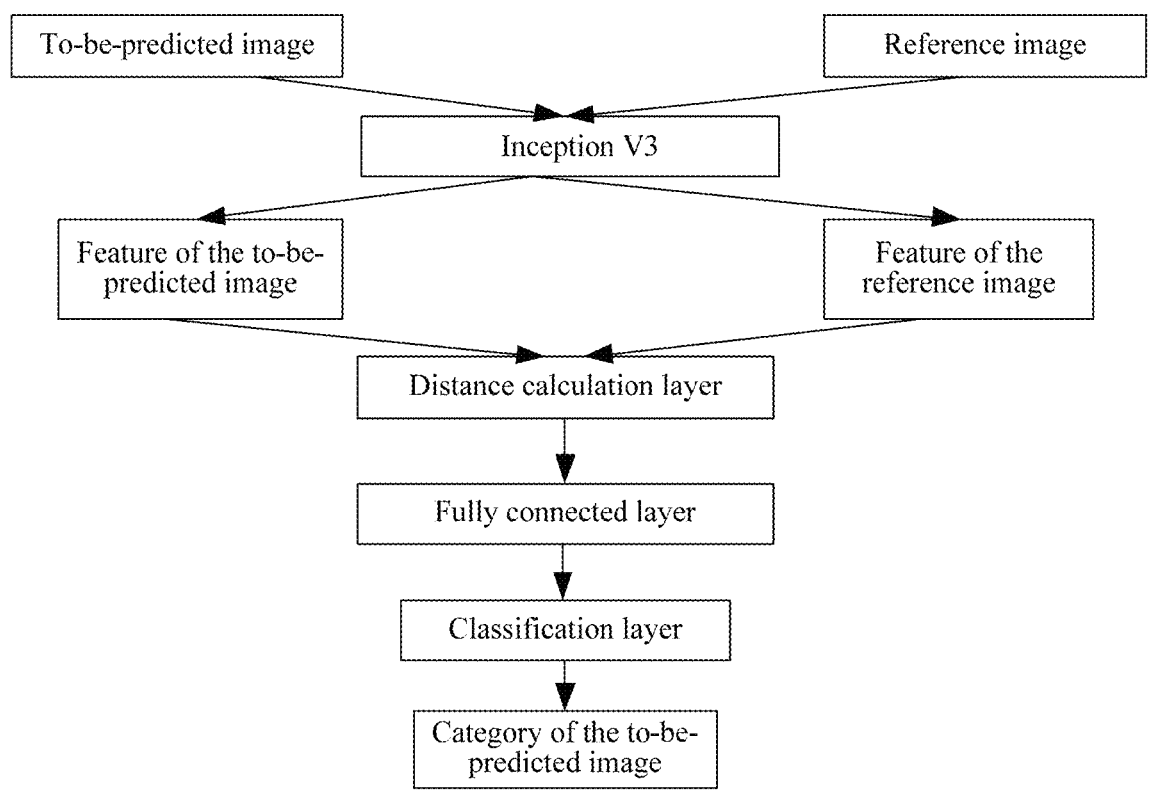
FIG. 8 is a schematic structural diagram of a neural network model according to the embodiment shown in FIG. 7.

S14. Build an initial neural network model by sequentially connecting, based on an average pooling layer in Inception V3 trained on ImageNet, a distance calculation layer, a fully connected layer, and a classification layer using a sigmoid function. As shown in FIG. 8, the initial neural network model is a combined neural network model. According to the description of the foregoing embodiment of the present disclosure, it may be learned that Inception V3 may be replaced by any other existing neural network model, and the combined neural network model may be formed by connecting any existing neural network model with the distance calculation layer, the fully connected layer, and the classification layer. The image feature is extracted using any existing neural network model to build a neural network model before training, so that the neural network model may be built more simply while ensuring classification accuracy.

S15. Train the neural network model based on the category of the included object and a training set constructed by combining the adjusted original fundus image and the new fundus image. As an optional solution, different batches of training sets are constructed by combining the adjusted original fundus image and new fundus image in pairs, an initial neural network model is input for training, and a plurality of iterations are performed until the loss function of the neural network model satisfies the convergence condition to obtain a trained neural network model.

S16. Input a to-be-predicted fundus image into the trained neural network model, and determine a category of the to-be-predicted fundus image. As an optional solution, the combined neural network model receives, as inputs through Inception V3, the to-be-predicted fundus image and the reference image labeled with the category of the object, extracts the image feature through an intermediate layer of Inception V3, and two feature vectors of the same dimensions such as 2048 dimensions are generated through the average pooling layer. A distance between two feature vectors of the same dimensions is calculated through the distance calculation layer to obtain a distance vector, such as a 2048-dimensional distance vector. Down sampling is performed through the fully connected layer to obtain a distance vector after dimension reduction, such as a 512-dimensional distance vector. The distance vector after dimension reduction is input into the classification layer with the excitation function as the sigmoid function, the distance vector is mapped to a specific value space (0, 1) through the classification layer to obtain a probability that the to-be-predicted image belongs to the labeled category corresponding to the reference image, thereby obtaining a corresponding classification result. The reference image may be an image labeled with four categories: normal, early, advanced (medium), and late, so that the determining result of the category of the to-be-predicted image is normal, early, advanced (medium), or late.

In the foregoing image classification methods, the example where the original image is a fundus image is used for description. As eyes are one of the most important organs of the human body, a person obtains information from the outside world mainly realized through the eyes. An eye disease may affect eyesight, or even may cause blindness and disability. Loss of vision is bound to greatly reduce living quality of a patient. Occult eye diseases such as glaucoma and diabetic retinopathy have no eyesight changes in the early stage, and fundus photography is an effective method for early detection of occult eye diseases. Fundus photography is a fundus examination that has been used more frequently in recent years, which is to use a special instrument such as a digital camera to connect to a fundus mirror to display the fundus image on a computer device. The fundus image may be printed and saved in the medical record, and may further be used for comparison before and after treatment. The fundus image can objectively record the retinal morphological changes of the fundus, and has good objectivity, repeatability, and comparability. At present, the fundus image is used for fundus screening, the fundus image is graded through interpretation by an ophthalmologist at an interpretation center, so that the patient may get early treatment, and the progress of the disease may be delayed, to implement a transition from disease treatment to disease prevention. However, a fundus screening project using the fundus photography technology usually generates a large quantity of fundus photos that need to be graded, most of the fundus photos being normal. This situation will cause most of the grading time of ophthalmologists to be spent on normal fundus photos without any eye disease symptom. Not only accuracy of classification depends on the personal level of the ophthalmologist for interpretation, but also the classification efficiency is very low. According to the image classification method provided in some embodiments of the present disclosure, the fundus image may be classified effectively, with high accuracy, automatically. The method is simple to use and has a fast determining speed. Even if there is no professional recognition ability for a fundus photo, an accurate determining result may be obtained quickly, thereby improving the efficiency of classification of fundus photos and greatly reducing workload of a professional. Therefore, the determining result does not depend on the individual professional level, and the classification accuracy is high and stable.

In the foregoing image classification method, a new fundus image is obtained by adjusting the original fundus image and transforming the display parameter of the original fundus image based on the distribution condition that the display parameter of the original fundus image need to satisfy. The training set for training the neural network model is constructed by combining the original fundus image and the new image. In a case that there are very few training samples, the training set may be expanded exponentially by combining the training samples to train the neural network model, so as to obtain sufficient classification dimensions and ensure classification accuracy. Glaucoma classification is used as an example. There are very few glaucoma fundus images through professional labelling, and there are few existing glaucoma fundus images labeled in the pre-trained image data set. According to the image classification method provided in the embodiments of the present disclosure, training difficulty may be greatly reduced. Dimensions of the classification are not limited to normal and abnormal. Classification and recognition of different severity levels may further be achieved under an abnormal condition, ensuring high and stable classification accuracy.

Figure 9:
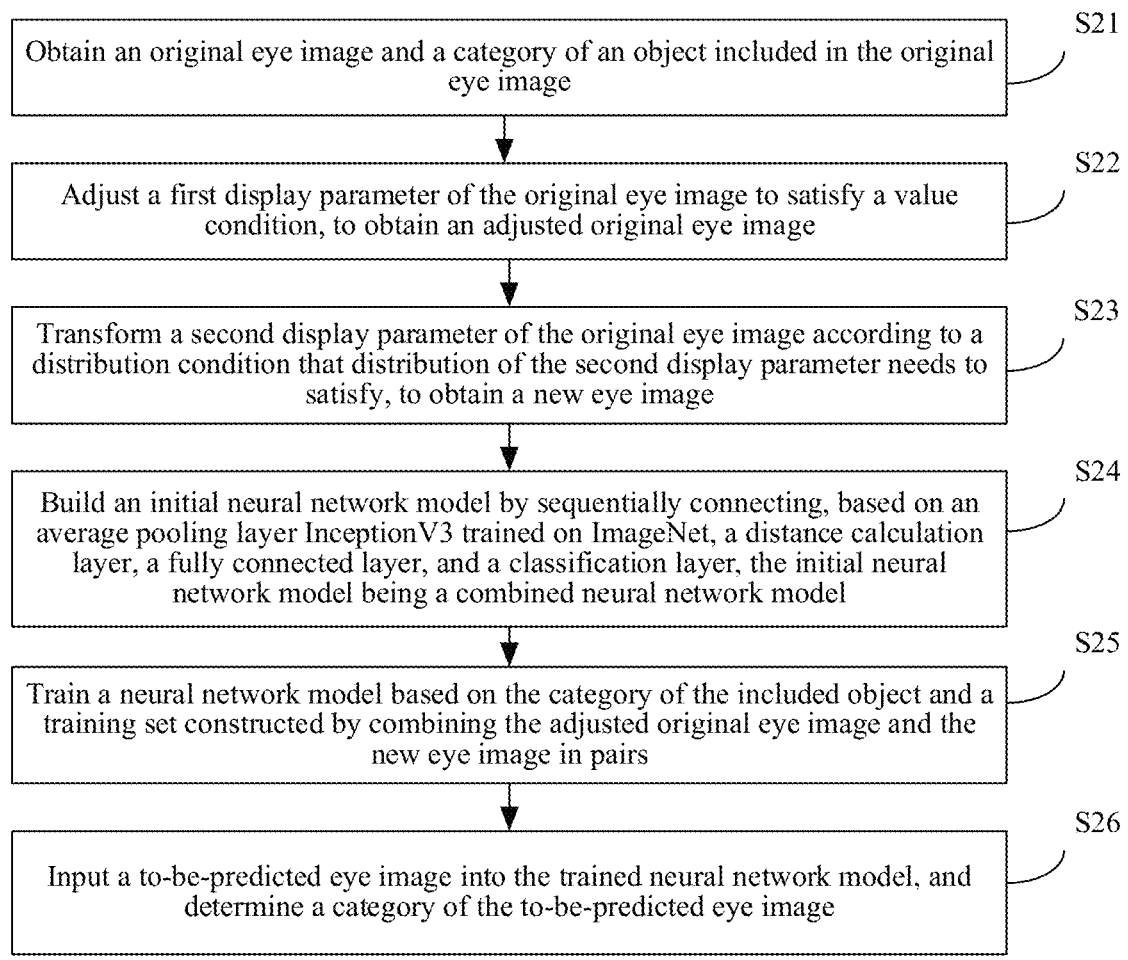
FIG. 9 is a flowchart of an image classification method according to another specific embodiment.

Reference is made to FIG. 9, in which an original image is used as an eye image, Inception V3 pre-trained based on a pre-trained image data set ImageNet is an initial neural network model, and a combined neural network model is constructed and trained. The image classification method provided in some embodiments of the present disclosure is described as follows.

S21. Obtain an original eye image and a category of an object included in the original eye image. As an optional solution, an object included in the original eye image is eyes, and a category of the object includes five categories of eyes with different shapes: phoenix eyes, triangular eyes, willow eyes, fox eyes, and almond eyes.

S22. Adjust a display parameter of the original eye image to satisfy a value condition, to obtain an adjusted original eye image; as an optional solution, the adjusting a display parameter of the original eye image to satisfy a value condition includes: scaling the original eye image so that the original eye image uses the eye as a center and has the same dimensions, such as 300 pixels; multiplying each pixel value in the original eye image by a preset fixed value, and then adding each pixel value to a grayscale value at a preset ratio; cropping a non-imaging no-information region of the original eye image; and scaling the original eye image to a preset size, such as 299 pixels wide and 299 pixels high. In this way, a part of a preset imaging structure in the original image, such as a part of an eye contour line in the original eye image, may be highlighted.

S23. Transform the display parameter of the original eye image according to a distribution condition that distribution of the display parameter needs to satisfy, to obtain a new eye image. As an optional solution, the method of transforming the display parameter of the original eye image according to a distribution condition that distribution of the display parameter needs to satisfy includes at least one of the following: horizontally flipping the original eye image or the new eye image with a preset probability value; randomly cropping a width and a height of the original eye image based on a first ratio range value; randomly performing addition/subtraction operation on brightness of the original eye image based on a second ratio range value; randomly performing multiplication/division operation on brightness of the original eye image based on a third ratio range value; randomly performing multiplication/division operation on contrast of the original eye image based on a fourth ratio range value; randomly scaling a width and a height of the original eye image based on a fifth ratio range value; and randomly rotating the original eye image based on a sixth ratio range value.

S24. Build an initial neural network model by sequentially connecting, based on an average pooling layer Inception V3 trained on ImageNet, a distance calculation layer, a fully connected layer, and a classification layer. The initial neural network model may be a combined neural network model shown in FIG. 8. Inception V3 may be replaced by any other existing neural network model, and the combined neural network model may be formed by connecting any existing neural network model with the distance calculation layer, the fully connected layer, and the classification layer. The image feature is extracted using any existing neural network model to build a neural network model before training, so that the neural network model may be built more simply while ensuring classification accuracy.

S25. Train a neural network model based on the category of the included object and a training set constructed by combining the adjusted original eye image and the new eye image in pairs. Different batches of training sets are constructed by combining the adjusted original eye image and new eye image in pairs, an initial neural network model is input for training, and a plurality of iterations are performed until the loss function of the neural network model satisfies the convergence condition to obtain a trained neural network model.

S26. Input a to-be-predicted eye image into the trained neural network model, and determine a category of the to-be-predicted eye image. As an optional solution, the combined neural network model receives, as inputs through Inception V3, the to-be-predicted eye image and the reference eye image labeled with the category of the object, extracts the image feature through an intermediate layer of Inception V3, and two feature vectors of the same dimensions such as 2048 dimensions are generated through the average pooling layer. A distance between two feature vectors of the same dimensions is calculated through the distance calculation layer to obtain a distance vector, such as a 2048-dimensional distance vector. Down sampling is performed through the fully connected layer to obtain a distance vector after dimension reduction, such as a 512-dimensional distance vector. The distance vector after dimension reduction is input into the classification layer with the excitation function as the sigmoid function, the distance vector is mapped to a specific value space (0, 1) through the classification layer to obtain a probability that the to-be-predicted eye image belongs to the category that is of the object and that is labeled for the reference eye image, thereby obtaining a corresponding classification result. The reference eye image may be an eye image labeled with five categories of phoenix eyes, triangular eyes, willow eyes, fox eyes, and almond eyes, respectively, so that the determining result of the category of the to-be-predicted image may be phoenix eyes, triangular eyes, willow eyes, fox eyes, and almond eyes.

In the foregoing image classification method, the example where the original image is an eye image is used. The image classification method provided in some embodiments of the present disclosure is used to determine whether the eyes in the eye image are phoenix eyes, triangular eyes, willow eyes, fox eyes, or almond eyes. The recognition of the eye shape in the eye image in this embodiment is an example of the case that the dimension used for classifying the object included in the image may be an external characteristic presented by the appearance of the object. It may be understood that, under the technical concept disclosed in the embodiments of the present disclosure, the original image may further be other images that include other objects and classify the objects, and include a very small quantity of images in the category. The original image is adjusted, the display parameter of the original image are transformed according to the distribution condition that distribution of the display parameter of the original image needs to satisfy, to obtain a new image. A training set for training the neural network model is constructed by combining the original image and the new image. In a case that there are very few training samples, the training set may be expanded exponentially by combining the training samples to train the neural network model, thereby obtaining sufficient classification dimensions and ensuring the classification accuracy.

It is to be understood that although the steps in the flowcharts of FIG. 2, FIG. 7, and FIG. 9 are sequentially displayed in accordance with instructions of arrows, these steps are not necessarily performed sequentially in the order indicated by the arrows. Unless clearly specified in this specification, execution of these steps is not strictly limited, and these steps may be performed in other orders. Moreover, at least some of the steps in FIG. 2, FIG. 7, and FIG. 9 may include a plurality of sub-steps or a plurality of stages. These sub-steps or stages are not necessarily performed at the same moment, but may be performed at different times. These sub-steps or stages are not necessarily executed sequentially, but may be performed with at least one part of the other steps or sub-steps of other steps or stages in turn.

Figure 10:
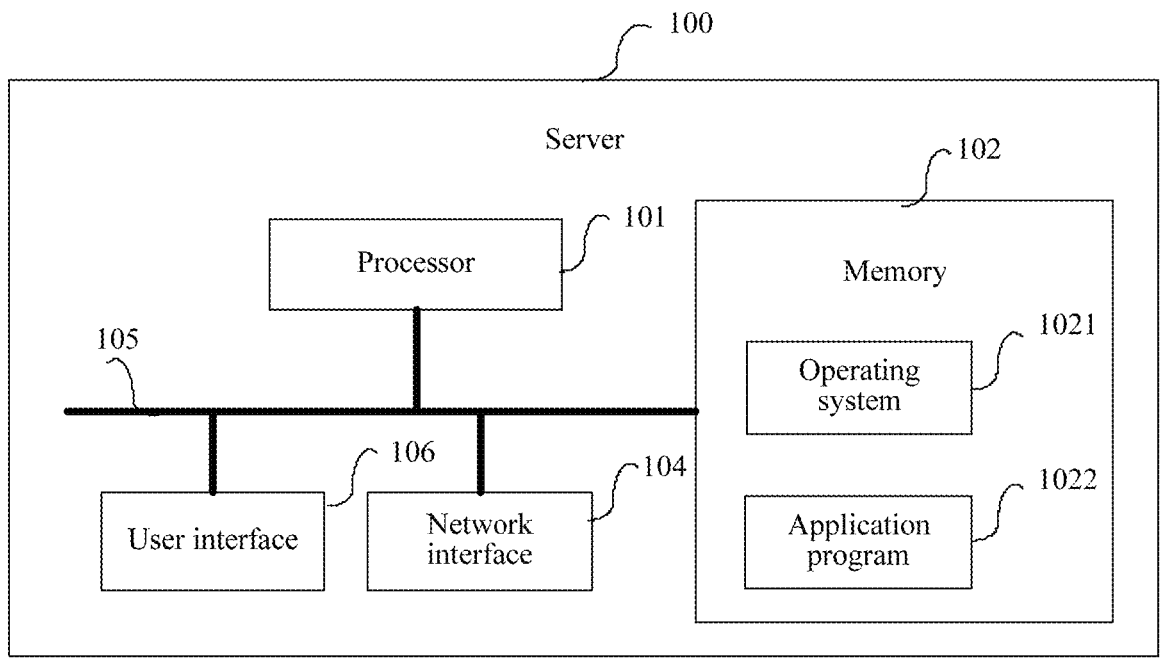
FIG. 10 is a schematic structural diagram of hardware of a server according to an embodiment.

The image classification method provided in some embodiments of the present disclosure may be implemented on a terminal side or a server side. As for a hardware structure of the server, reference is made to FIG. 10, FIG. 10 is a schematic structural diagram of optional hardware of a server 100 according to an embodiment of the present disclosure. The server 100 may be a mobile phone, a computer device, a tablet device, a personal digital assistant, a medical device, and the like. The server 100 includes: at least one processor 101, a memory 102, at least one network interface 104, and a user interface 106. The memory 100 includes a non-volatile storage medium and an internal memory. The non-volatile storage medium of the server 100 stores an operating system and may further store computer-readable instructions, the computer-readable instructions, when executed by a processor, causing the processor to implement an image classification method. The internal memory may also store computer-readable instructions, the computer-readable instructions, when executed by the processor, causing the processor to execute the image classification method. Various assemblies in the server are coupled together via a bus system 105. It may be understood that the bus system 105 is configured to implement connection and communication between these assemblies. In addition to a data bus, the bus system 105 further includes a power bus, a control bus, and a status signal bus. However, for the sake of clarity, various buses are marked as a bus system in FIG. 10.

The user interface 106 may include a display, a keyboard, a mouse, a trackball, a click wheel, a key, a button, a touchpad, or a touch screen.

It may be understood that the non-volatile memory may be a read-only memory (ROM), or a programmable read-only memory (PROM), which may be used as an external cache. According to exemplary but not limited descriptions, many forms of RAMs are available, for example, a static random access memory (SRAM), a synchronous static random access memory (S SRAM), and the like. The memory according to the embodiments of the present disclosure is intended to include, but not limited to, these and any other suitable types of memories.

The memory 102 in the embodiment of the present disclosure is configured to store various types of data to support operation of the server 100. An example of the data includes: any executable program operating on the server 100, for example, an operating system 1021 and an application program 1022; an original image; and a new image obtained by transforming the original image. The operating system 1021 includes various system programs, for example, a framework layer, a core library layer, a driver layer, and the like, which are used for implementing various basic services and processing a task based on hardware. The application program 1022 may include various application programs such as a media player, a browser, and the like, used for implementing various application services. The image classification method provided in some embodiments of the present disclosure may be included in the application program 1022.

The method disclosed in some embodiments of the present disclosure may be applied to the processor 101 or implemented by the processor 101. The processor 101 may be an integrated circuit chip and has a signal processing capability. During implementation, each step of the foregoing method may be completed through an integrated logic circuit of hardware in the processor 101 or an instruction in the form of software. The foregoing processor 101 may be a general-purpose processor, a digital signal processor (DSP), or other programmable logic devices, a discrete gate or a transistor logic device, a discrete hardware component, and the like. The processor 101 may implement or execute various methods, steps, and logic block diagrams disclosed in the embodiments of the present disclosure. The general-purpose processor 101 may be a microprocessor, any conventional processor, or the like. In combination with the image classification method provided in some embodiments of the present disclosure, the steps may be directly implemented by a hardware decoding processor, or may be performed by a combination of hardware and software modules in the decoding processor. The software module may be located in a storage medium, the storage medium being located in the memory. The processor reads the information in the memory and completes the steps of the foregoing method in combination with hardware thereof.

In an exemplary embodiment, the server 100 may be implemented by one or more application specific integrated circuits (ASIC), a DSP, a programmable logic device (PLD), and a complex programmable logic device (CPLD) to perform the foregoing method.

Figure 11:
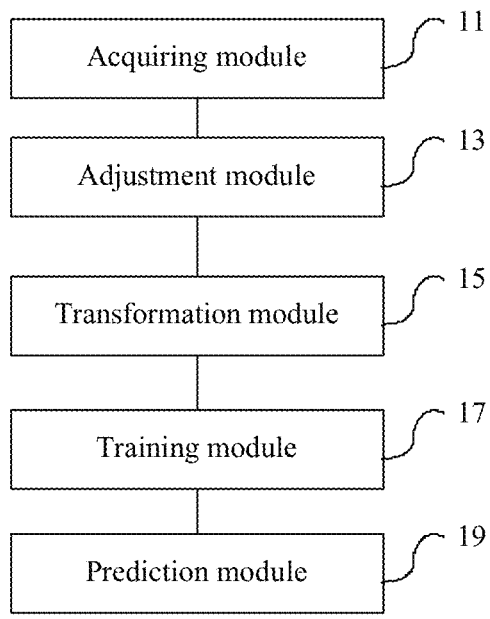
FIG. 11 is a schematic structural diagram of a server according to another embodiment.

In an exemplary embodiment, referring to FIG. 11, FIG. 11 is a schematic structural diagram of a server according to an embodiment. Each of the following modules may be implemented in whole or in part by software, hardware or a combination thereof. Referring to FIG. 11, the server includes: an acquiring module 11 configured to obtain an original image and a category of an object included in the original image; an adjusting module 13 configured to adjust a display parameter of the original image so that the adjusted display parameter satisfies a value condition; a transformation module 15 configured to transform the display parameter of the original image according to a distribution condition that distribution of the display parameter needs to satisfy, to obtain a new image; a training module 17 configured to train a neural network model based on the category of the included object and a training set constructed by combining the adjusted original image and the new image; and a prediction module 19 configured to input, based on the trained neural network model, a to-be-predicted image into the neural network model, and determine a category of an object included in the to-be-predicted image.

In one embodiment, the adjustment module 13 includes a detection unit and an adjustment unit. The detection unit is configured to detect an imaging region of an object included in the original image. The adjustment unit is configured to adjust dimensions of the original image to be consistent with dimensions of the imaging region of the object.

In another embodiment, the adjustment module 13 includes an enhancement unit configured to perform image enhancement processing on each color channel of the original image based on a recognition degree that the original image needs to satisfy.

In still another embodiment, the adjustment module 13 includes a cropping unit and an adjustment unit. The cropping unit is configured to crop a non-imaging region of an object in the original image. The adjustment unit is configured to adjust a cropped image to preset dimensions.

In one embodiment, the transformation module 15 includes a determining unit and a transformation unit. The determining unit is configured to determine, according to a value space corresponding to a category of the display parameter and a distribution condition that the value space satisfies, an image transformation configuration for transforming the display parameter of the original image. The transformation unit is configured to transform the display parameter of the original image according to the image transformation configuration, to obtain a new image.

In one embodiment, the training module includes an initialization unit and a combined model training unit. The initialization unit is configured to initialize a neural network model. The combined model training unit is configured to initialize a distance calculation layer, a fully connected layer, and a classification layer that are sequentially connected to the neural network model, to obtain a combined neural network model for classifying the to-be-predicted image. The image included in the training set and a corresponding category are input to the neural network model for iterative training until the loss function of the neural network model satisfies the convergence condition.

The server further includes a loss function determining module configured to obtain the loss function of the neural network model according to a cross-entropy cost function.

In an embodiment, the prediction module is specifically configured to: in a combined neural network model, extract, using the combined neural network model, an image feature of the to-be-predicted image and an image feature of the reference image labeled with the category of the object, the reference image being an image in the training set; determine a distance vector between the image feature of the to-be-predicted image and the image feature of the reference image, and down-sampling the distance vector; and map the down-sampled distance vector to a specific value space to obtain a probability that the to-be-predicted image belongs to the labeled category corresponding to the reference image.

In an embodiment, the server further includes a training set module configured to construct a training set by combining the adjusted original image and the new image in pairs.

When the server provided in the foregoing embodiment performs image classification, only division of the foregoing program modules is used as an example for sake of description. In actual application, the foregoing processing allocation may be completed by different program modules as required, that is, an internal structure of the server is divided into different program modules to complete all or part of the processing described above. In addition, the server and the image classification method provided in the foregoing embodiments are based on the same concept. Therefore, for a detailed implementation process, reference is made to the method embodiments, and the details are not described herein again.

In an exemplary embodiment, an embodiment of the present disclosure further provides a non-volatile computer-readable storage medium storing computer-readable instructions, the computer-readable instructions, when executed by one or more processors, causing one or more processors to perform the steps of the image classification method in any of the foregoing embodiments. The computer-readable storage medium may be a memory such as an FRAM, a ROM, a PROM, an EPROM, an EEPROM, a flash memory, a magnetic surface memory, an optical disk, or a CD-ROM, or may be various devices including one or any combination of the foregoing memories, for example, a mobile phone, a computer device, a tablet device, a personal digital assistant, a medical device, and the like.

An embodiment of the present disclosure further provides a server, the server including: a processor configured to store computer-readable instructions that can be run on the processor, the processor being configured to perform the following method when running the computer-readable instructions. An image classification method includes: obtaining an original image and a category of an object included in the original image; adjusting a display parameter of the original image so that the adjusted display parameter satisfies a value condition; transforming the display parameter of the original image according to a distribution condition that distribution of the display parameter needs to satisfy, to obtain a new image; training a neural network model based on the category of the included object and a training set constructed by combining the adjusted original image and the new image; and inputting, based on the trained neural network model, a to-be-predicted image into the neural network model, and determining a category of an object included in the to-be-predicted image.

In an embodiment, when executed by the processor to perform the operation of adjusting a display parameter of the original image so that the adjusted display parameter satisfies a value condition, the computer-readable instructions cause the processor to specifically perform the following operation to detect an imaging region of the object included in the original image: adjusting dimensions of the original image to be consistent with dimensions of the imaging region of the object.

In an embodiment, when executed by the processor to perform the operation of adjusting a display parameter of the original image so that the adjusted display parameter satisfies a value condition, the computer-readable instructions cause the processor to specifically perform the following operations to perform image enhancement processing on each color channel of the original image based on a recognition degree that the original image needs to satisfy.

In an embodiment, when executed by the processor to perform the operation of adjusting a display parameter of the original image so that the adjusted display parameter satisfies a value condition, the computer-readable instructions cause the processor to specifically perform the following operations: cropping a non-imaging region of the object in the original image; and adjusting the cropped image to preset dimensions.

In an embodiment, when executed by the processor to perform the operation of transforming the display parameter of the original image according to a distribution condition that distribution of the display parameter needs to satisfy, to obtain a new image, the computer-readable instructions cause the processor to specifically perform the following operations: determining, according to a value space corresponding to a category of the display parameter and a distribution condition associated with the value space, an image transformation configuration for transforming the display parameter of the original image; and transforming the display parameter of the original image according to the image transformation configuration, to obtain a new image.

In an embodiment, when executed by the processor to perform the operation of training a neural network model, the computer-readable instructions cause the processor to specifically perform the following operations: initializing the neural network model; and initializing a distance calculation layer, a fully connected layer, and a classification layer that are sequentially connected to the neural network model, to obtain a combined neural network model for classifying the to-be-predicted image, and inputting an image included in the training set and a corresponding category into the neural network model for iterative training until a loss function of the neural network model satisfies a convergence condition.

In an embodiment, when executed by the processor, the computer-readable instructions cause the processor to further perform the following operation: obtaining a loss function of the neural network model according to a cross-entropy cost function.

In an embodiment, when executed by the processor to perform the operation of inputting, based on the trained neural network model, a to-be-predicted image into the neural network model, and determining the category of the object included in the to-be-predicted image, the computer-readable instructions cause the processor to specifically perform the following operations: in a combined neural network model, extracting, using the combined neural network model, an image feature of a to-be-predicted image and an image feature of a reference image labeled with the category of the object, the reference image being an image in the training set; determining a distance vector between the image feature of the to-be-predicted image and the image feature of the reference image, and performing down-sampling processing on the distance vector; and mapping the down-sampled distance vector to a specific value space to obtain a probability that the to-be-predicted image belongs to the labeled category corresponding to the reference image.

In an embodiment, when executed by the processor, the computer-readable instructions cause the processor to further perform the following operation: constructing a training set by combining the adjusted original image and the new image in pairs.

In another embodiment, the server may be the server 200 shown in FIG. 1, and includes a processor and a memory connected through a system bus. The memory stores an executable program, and the processor is configured to implement a computing function and a function of controlling the server to operate. When the processor is configured to execute the executable program stored in the memory, the image classification method provided in some embodiments of the present disclosure is implemented.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. Any reference to a memory, storage, database or another medium used in the various embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

The technical features in the foregoing embodiments may be randomly combined. For concise description, not all possible combinations of the technical features in the embodiments are described. However, the combinations of the technical features are all to be considered as falling within the scope described in this specification provided that they do not conflict with each other. The foregoing embodiments only show several implementations of the present disclosure and are described in detail, but they are not to be construed as a limit to the patent scope of the present disclosure. A person of ordinary skill in the art may make various changes and improvements without departing from the ideas of the present disclosure, which shall all fall within the protection scope of the present disclosure. Therefore, the protection scope of the patent of the present disclosure shall be subject to the appended claims.

What is claimed is:

1. An image classification method performed on a server, the method comprising:
   obtaining an original image and a category of an object comprised in the original image;
   adjusting a first display parameter of the original image to obtain an adjusted first display parameter of an adjusted original image, the adjusted first display parameter satisfying a value condition;
   transforming a second display parameter of the original image to obtain a transformed second display parameter of a new image, the transformed second display parameter of the new image satisfying a distribution condition;
   training a neural network model to obtain a trained neural network model based on the category of the object and a training set constructed by combining the adjusted original image and the new image, wherein trained neural network model is obtained by:
      initializing the neural network model; and
      initializing a distance calculation layer, a fully connected layer, and a classification layer that are sequentially connected to the neural network model, to obtain a combined neural network model, and inputting an image comprised in the training set and corresponding category into the combined neural network model for iterative training until a loss function of the combined neural network model satisfies a convergence condition; and inputting a to-be-predicted image into the trained neural network model, and determining a category of an object comprised in the to-be-predicted image.

2. The image classification method according to claim 1, wherein adjusting the first display parameter of the original image comprises:

detecting an imaging region of the object comprised in the original image; and adjusting dimensions of the original image to be consistent with dimensions of the imaging region of the object.

3. The image classification method according to claim 1, wherein adjusting the first display parameter of the original image comprises:

performing image enhancement processing on a color channel of the original image to obtain the adjusted original image.

4. The image classification method according to claim 1, wherein adjusting the first display parameter of the original image comprises:

cropping a non-imaging region of the object in the original image; and adjusting the cropped image to preset dimensions, to obtain the adjusted original image.

5. The image classification method according to claim 1, wherein transforming the second display parameter of the original image comprises:

determining an image transformation configuration for transforming the second display parameter of the original image; and transforming the second display parameter of the original image according to the image transformation configuration, to obtain the new image.

6. The image classification method according to claim 1, wherein determining the category of an object comprised in the to-be-predicted image comprises:

extracting an image feature of the to-be-predicted image and an image feature of a reference image comprising an object belonging to a labeled category, the reference image being an image in the training set;

determining a distance vector between the image feature of the to-be-predicted image and the image feature of the reference image; and mapping the distance vector to a value space to obtain a probability of the to-be-predicted image belonging to the labeled category corresponding to the reference image.

7. The image classification method according to claim 1, wherein the new image is a first new image, and the method further comprises:

obtaining a second new image, wherein the second new image has a second display parameter satisfying the distribution condition; and constructing the training set by combining the adjusted original image and a pair of the first and the second new images.

8. A server, comprising a processor and a memory, the memory storing computer-readable instructions, the computer-readable instructions, when executed by the processor, causing the processor to perform:

obtaining an original image and a category of an object comprised in the original image;

adjusting a first display parameter of the original image to obtain an adjusted first display parameter of an adjusted original image, the adjusted first display parameter satisfying a value condition;

transforming a second display parameter of the original image to obtain a transformed second display parameter of a new image, the transformed second display parameter of the new image satisfying a distribution condition;

training a neural network model to obtain a trained neural network model based on the category of the object and a training set constructed by combining the adjusted original image and the new image, wherein trained neural network model is obtained by:

initializing the neural network model; and initializing a distance calculation layer, a fully connected layer, and a classification layer that are sequentially connected to the neural network model, to obtain a combined neural network model, and inputting an image comprised in the training set and corresponding category into the combined neural network model for iterative training until a loss function of the combined neural network model satisfies a convergence condition; and inputting a to-be-predicted image into the trained neural network model, and determining a category of an object comprised in the to-be-predicted image.

9. The server according to claim 8, wherein adjusting the first display parameter of the original image comprises:

detecting an imaging region of the object comprised in the original image; and adjusting dimensions of the original image to be consistent with dimensions of the imaging region of the object.

10. The server according to claim 8, wherein adjusting the first display parameter of the original image comprises:

performing image enhancement processing on a color channel of the original image to obtain the adjusted original image.

11. The server according to claim 8, wherein adjusting the first display parameter of the original image comprises:

cropping a non-imaging region of the object in the original image; and adjusting the cropped image to preset dimensions, to obtain the adjusted original image.

12. The server according to claim 8, wherein transforming the second display parameter of the original image comprises:

determining an image transformation configuration for transforming the second display parameter of the original image; and transforming the second display parameter of the original image according to the image transformation configuration, to obtain the new image.

13. The server according to claim 8, wherein determining the category of an object comprised in the to-be-predicted image comprises:

extracting an image feature of the to-be-predicted image and an image feature of a reference image comprising an object belonging to a labeled category, the reference image being an image in the training set;

determining a distance vector between the image feature of the to-be-predicted image and the image feature of the reference image; and mapping the distance vector to a value space to obtain a probability of the to-be-predicted image belonging to the labeled category corresponding to the reference image.

14. The server according to claim 8, wherein the new image is a first new image, and when executed by the processor, the computer-readable instructions cause the processor to further perform the following operation:
obtaining a second new image, wherein the second new image has a second display parameter satisfying the distribution condition; and
constructing the training set by combining the adjusted original image and a pair of the first and the second new images.

15. A non-transitory computer-readable storage medium storing computer-readable instructions, the computer-readable instructions, when executed by one or more processors, causing the one or more processors to perform the following operations:
obtaining an original image and a category of an object comprised in the original image;
adjusting a first display parameter of the original image to obtain an adjusted first display parameter of an adjusted original image, the adjusted first display parameter satisfying a value condition;
transforming a second display parameter of the original image to obtain a transformed second display parameter of a new image, the transformed second display parameter of the new image satisfying a distribution condition;
training a neural network model to obtain a trained neural network model based on the category of the object and a training set constructed by combining the adjusted original image and the new image, wherein trained neural network model is obtained by:
initializing the neural network model; and
initializing a distance calculation layer, a fully connected layer, and a classification layer that are sequentially connected to the neural network model, to obtain a combined neural network model, and inputting an image comprised in the training set and corresponding category into the combined neural network model for iterative training until a loss function of the combined neural network model satisfies a convergence condition; and
inputting a to-be-predicted image into the trained neural network model, and determining a category of an object comprised in the to-be-predicted image.

16. The storage medium according to claim 15, wherein adjusting the first display parameter of the original image comprises:
detecting an imaging region of the object comprised in the original image; and
adjusting dimensions of the original image to be consistent with dimensions of the imaging region of the object.

17. The storage medium according to claim 15, wherein adjusting the first display parameter of the original image comprises:
performing image enhancement processing on a color channel of the original image to obtain the adjusted original image.

18. The storage medium according to claim 15, wherein the new image is a first new image, and the computer-readable instructions cause the one or more processors to perform the following operations:
obtaining a second new image, wherein the second new image has a second display parameter satisfying the distribution condition; and
constructing the training set by combining the adjusted original image and a pair of the first and the second new images.

19. The storage medium according to claim 15, wherein adjusting the first display parameter of the original image comprises:
cropping a non-imaging region of the object in the original image; and
adjusting the cropped image to preset dimensions, to obtain the adjusted original image.

20. The storage medium according to claim 15, wherein transforming the second display parameter of the original image comprises:
determining an image transformation configuration for transforming the second display parameter of the original image; and
transforming the second display parameter of the original image according to the image transformation configuration, to obtain the new image.

\* \* \* \* \*